United States Patent
Mizukoshi et al.

(10) Patent No.: US 7,396,024 B2
(45) Date of Patent: Jul. 8, 2008

(54) FLUID PRESSURE CONTROL APPARATUS FOR STABILIZERS

(75) Inventors: Hideo Mizukoshi, Hazu-gun (JP); Hideyuki Kobayashi, Toyota (JP); Akira Kasamatsu, Toyota (JP)

(73) Assignees: Aisin Seiki Kabushiki Kaisha, Kariya-Shi, Aichi-Ken (JP); Toyota Jidosha Kabushiki Kaisha, Toyota-Shi, Aichi-Ken (JP)

( * ) Notice: Subject to any disclaimer, the term of this patent is extended or adjusted under 35 U.S.C. 154(b) by 449 days.

(21) Appl. No.: 11/247,357

(22) Filed: Oct. 12, 2005

(65) Prior Publication Data

US 2007/0235955 A1    Oct. 11, 2007

(30) Foreign Application Priority Data

Oct. 12, 2004    (JP)    .............................. 2004-297904

(51) Int. Cl.
*B60G 17/015*    (2006.01)
(52) U.S. Cl. ............................. 280/5.511; 280/124.106; 280/124.157; 280/124.16; 280/124.161
(58) Field of Classification Search ............... 280/5.511, 280/124.106, 124.157, 124.16, 5.508, 124.161, 280/124.159; 91/172
See application file for complete search history.

(56) References Cited

U.S. PATENT DOCUMENTS

| 4,270,771 | A | * | 6/1981 | Fujii | ........................ | 280/5.514 |
| 4,516,472 | A | * | 5/1985 | Kobayashi | ..................... | 91/392 |
| 4,943,084 | A | * | 7/1990 | Fukunaga et al. | ........ | 280/5.507 |
| 4,948,165 | A | * | 8/1990 | Takahashi et al. | ........ | 280/5.508 |
| 4,973,079 | A | * | 11/1990 | Tsukamoto | ............... | 280/5.502 |
| 5,054,808 | A | * | 10/1991 | Tsukamoto | .................. | 280/5.5 |
| 5,290,048 | A | * | 3/1994 | Takahashi et al. | ......... | 280/5.508 |
| 5,416,701 | A | * | 5/1995 | Kawabata | ..................... | 701/37 |
| 5,480,188 | A | * | 1/1996 | Heyring | ............... | 280/124.104 |
| 6,428,024 | B1 | * | 8/2002 | Heyring et al. | ......... | 280/124.106 |
| 7,234,707 | B2 | * | 6/2007 | Green et al. | ............. | 280/5.511 |

FOREIGN PATENT DOCUMENTS

| JP | 1999-510761 A | 9/1999 |
| JP | 2001-506560 A | 5/2001 |
| WO | 97/06971 | 2/1997 |
| WO | 98/28160 | 7/1998 |

\* cited by examiner

*Primary Examiner*—Eric Culbreth
*Assistant Examiner*—Nicole Verley
(74) *Attorney, Agent, or Firm*—Buchanan Ingersoll & Rooney PC

(57) ABSTRACT

A hydraulic pressure control apparatus for stabilizers controls hydraulic fluid in a hydraulic communication path hydraulically connecting cylinders each operatively connected to each stabilizer of a vehicle. The apparatus includes a spool valve provided in the hydraulic communication path. The spool valve includes a housing, a spool accommodated in the housing, first and second spool chambers defined by the spool and the housing, and a biasing member for biasing the spool. The apparatus further includes first, second, and third hydraulic communication passages, hydraulically connecting an accumulator hydraulically connected to the second spool chamber and the hydraulic communication path, hydraulically connecting the first spool chamber and the hydraulic communication path, and hydraulically connecting the spool chamber and the accumulator respectively, first, second, and third solenoid valves provided in the first, second, and third hydraulic communication passages respectively, and a control device for controlling the first, second and third valves.

11 Claims, 4 Drawing Sheets

FIG. 3

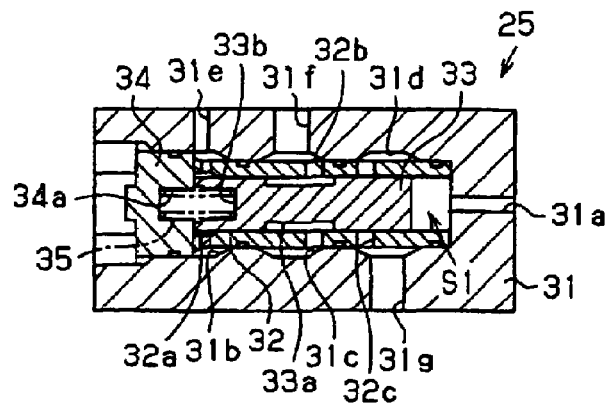

FIG. 4

| Step | Operated valve | Operation mode | State of oil pressure circuit |
|---|---|---|---|
| Front-rear cylinders cut mode | | | |
| Step1 | ACC solenoid | Open→Close | Cut between ACC system and cylinder system |
| Step2 | Front-rear cut solenoid | Close→Open | Introduce cylinder pressure into first spool chamber to move spool |
| Step3 | Front-rear cut solenoid | Open→Close | Spool is located in second spool chamber at this time |
| Front-rear cylinders connection recovery mode | | | |
| Step4 | Pressure release solenoid | Close→Open Open→Close | Spool moves back toward first spool chamber, opening hydraulic communication tube |
| Step5 | ACC solenoid | Close→Open | ACC system and cylinder system are hydraulically connected, recovering to initial state |

FLUID PRESSURE CONTROL APPARATUS FOR STABILIZERS

CROSS REFERENCE TO RELATED APPLICATIONS

This application is based on and claims priority under 35 U.S.C. § 119 to Japanese Patent Application 2004-297904, filed on Oct. 12, 2004, the entire content of which is incorporated herein by reference.

FIELD OF THE INVENTION

The present invention generally relates to a fluid pressure control apparatus for a stabilizer for a vehicle. More particularly, the present invention pertains to a fluid pressure control apparatus for a stabilizer for controlling a hydraulic pressure in relation to a stabilizer for suppressing rolling of the vehicle and thus maintaining stability while the vehicle is running.

BACKGROUND

As a conventional stabilizer, stabilizers described in JP 2001-506560A and JPH11-510761A are known. For example, in JP 2001-506560A, a torsion bar of U-shape having integrally formed horizontal arms is described. The horizontal torsion bar is provided corresponding to each of a front axle and a rear axle. The front horizontal torsion bar is relatively rotatably connected to an underbody. One end and the other end of the front horizontal torsion bar are connected to the front axle through a drop link and a front cylinder respectively. Thus, a roll posture control mechanism of the front axle is configured. Similarly, the rear horizontal torsion bar is relatively rotatably connected to the underbody. One end and the other end of the rear horizontal torsion bar are connected to the rear axle through a drop link and a rear cylinder. Thus, a roll posture control mechanism of the rear axle is configured. Then, upper chambers of the front cylinder and the rear cylinder are hydraulically connected each other by an upper hydraulic communication tube. Further, lower chambers of the front cylinder and the rear cylinder are hydraulically connected each other by a lower hydraulic communication tube. Thus, a roll moment reaction system, in which roll mode or joint motion mode of the axle motion is responsively applied, is configured.

In the configuration described above, for example, when roll moment occurs at the vehicle, the roll moment is applied to the front cylinder and the rear cylinder in a direction of compression. However, because the front and rear cylinders are hydraulically connected each other so that a hydraulic fluid can transfer therebetween, the cylinders are not compressed by effect of fluid pressure.

However, in the configuration described above, in a situation that roll moment occurs at the vehicle while the vehicle is turning, and that the roll moment is applied to both of the front cylinder and the rear cylinder in a direction of compression, for example, when balance between loads applied to both cylinders is influenced from surface condition of a road on which the vehicle is running or the like, the hydraulic fluid transfers between the cylinders through the upper hydraulic communication tube and the lower hydraulic communication tube. As a result, posture control of the vehicle in relation to roll becomes difficult.

Accordingly, in the situation described above, it is preferable that means for prohibiting hydraulic fluid from flowing between the front cylinder and the rear cylinder is provided. For example, the inventor of the present invention suggests to provide poppet type solenoid valves in the upper hydraulic communication tube and the lower hydraulic communication tube which selectively open and close the upper hydraulic communication tube and the lower hydraulic communication tube.

Here, in respect of cross sectional areas, cross sectional areas of the upper hydraulic communication tube and the lower hydraulic communication tube serving as a hydraulic communication path hydraulically connecting the front cylinder and the rear cylinder are set larger than that of a general fluid pressure system (such as a brake system of a vehicle) corresponding to required amount of flow of the hydraulic fluid. Accordingly, for directly opening and closing the upper hydraulic communication tube and the lower hydraulic communication tube having such a large cross sectional area utilizing such poppet type solenoid valve, a large solenoid that can generate larger electromagnetic force is required. Accordingly, it is difficult to prevent that the valve and overall system including the valve become larger.

A need thus exists for a fluid pressure control apparatus for stabilizers enabling further downsizing of the fluid pressure control apparatus for the stabilizers.

SUMMARY OF THE INVENTION

According to an aspect of the present invention, a hydraulic pressure control apparatus for a plurality of stabilizers provided in a vehicle for controlling hydraulic fluid in a hydraulic communication path hydraulically connecting a plurality of cylinders each operatively connected to each of the plurality of stabilizers includes a spool valve provided in the hydraulic communication path, the spool valve including a housing, a spool movably accommodated in the housing, a first spool chamber defined by the housing and one end of the spool, a second spool chamber defined by the housing and the other end of the spool and hydraulically connected to an accumulator, and a biasing member provided in the second spool chamber for biasing the spool toward the first spool chamber, and the spool relatively moved in the housing selectively toward the first spool chamber or toward the second spool chamber to selectively open or close the hydraulic communication path, a first hydraulic communication passage hydraulically connecting the accumulator and the hydraulic communication path and having a cross sectional area smaller than that of the hydraulic communication path, a first solenoid valve provided in the first hydraulic communication passage for selectively opening or closing the first hydraulic communication passage, a second hydraulic communication passage hydraulically connecting the first spool chamber and the hydraulic communication path and having a cross sectional area smaller than that of the hydraulic communication path, a second solenoid valve provided in the second hydraulic communication passage for selectively opening or closing the second hydraulic communication passage, a third hydraulic communication passage hydraulically connecting the accumulator and the first spool chamber and having a cross sectional area smaller than that of the hydraulic communication path, a third solenoid valve provided in the third hydraulic communication passage for selectively opening or closing the third hydraulic communication passage, and a control device for controlling the first, second and third solenoid valves to open and close.

According to a further aspect of the present invention, a hydraulic pressure control apparatus for a plurality of stabilizers provided in a vehicle for controlling hydraulic fluid in a hydraulic communication path hydraulically connecting a plurality of cylinders each operatively connected to each of the plurality of stabilizers includes a spool valve provided in the hydraulic communication path, the spool valve including a housing, a spool movably accommodated in the housing, a first spool chamber defined by the housing and one end of the spool, a second spool chamber defined by the housing and the other end of the spool and hydraulically connected to an accumulator, and a biasing member provided in the second spool chamber for biasing the spool toward the first spool chamber, and the spool relatively moved in the housing selectively toward the first spool chamber or toward the second spool chamber to selectively open or close the hydraulic communication path, a first hydraulic communication passage hydraulically connecting the accumulator and the hydraulic communication path and having a cross sectional area smaller than that of the hydraulic communication path, a first solenoid valve provided in the first hydraulic communication passage for selectively opening or closing the first hydraulic communication passage, a second hydraulic communication passage hydraulically connecting the first spool chamber and the hydraulic communication path and having a cross sectional area smaller than that of the hydraulic communication path, a second solenoid valve provided in the second hydraulic communication passage for selectively opening or closing the second hydraulic communication passage, a check valve provided in the second hydraulic communication passage for bypassing the second solenoid valve from the first spool chamber to the hydraulic communication path as a forward direction, and a control device for controlling the first and second solenoid valves to open and close.

According to a further aspect of the present invention, a hydraulic pressure control apparatus for a plurality of stabilizers provided in a vehicle for controlling hydraulic fluid in a main hydraulic communication path hydraulically connecting a plurality of cylinders each operatively connected to each of the plurality of stabilizers includes a spool valve provided in the main hydraulic communication path, the spool valve including a housing, a spool movably accommodated in the housing, the spool relatively moved in the housing for selectively opening or closing the main hydraulic communication path, a spool chamber defined by the housing and one end of the spool, the spool chamber into which the hydraulic fluid is supplied for pressing the one end of the spool, and a biasing member for biasing the spool toward the spool chamber, a first sub hydraulic communication passage hydraulically connecting the main hydraulic communication path and the spool chamber for supplying the hydraulic fluid in the main hydraulic communication path to the spool chamber, the first sub hydraulic communication passage having a cross sectional area smaller than that of the main hydraulic communication path, a first solenoid valve provided in the first sub hydraulic communication passage for selectively opening or closing the first sub hydraulic communication passage, a discharging mechanism for discharging the hydraulic fluid from the spool chamber, and a control device for controlling the first solenoid valve to open and close.

BRIEF DESCRIPTION OF THE DRAWINGS

The foregoing and additional features and characteristics of the present invention will become more apparent from the following detailed description considered with reference to the accompanying drawings, wherein:

FIG. 3 represents an explanatory view illustrating an operation of a spool valve;

FIG. 4 represents a step chart showing a control according to the first embodiment of the present invention.

DETAILED DESCRIPTION

Figure 1:
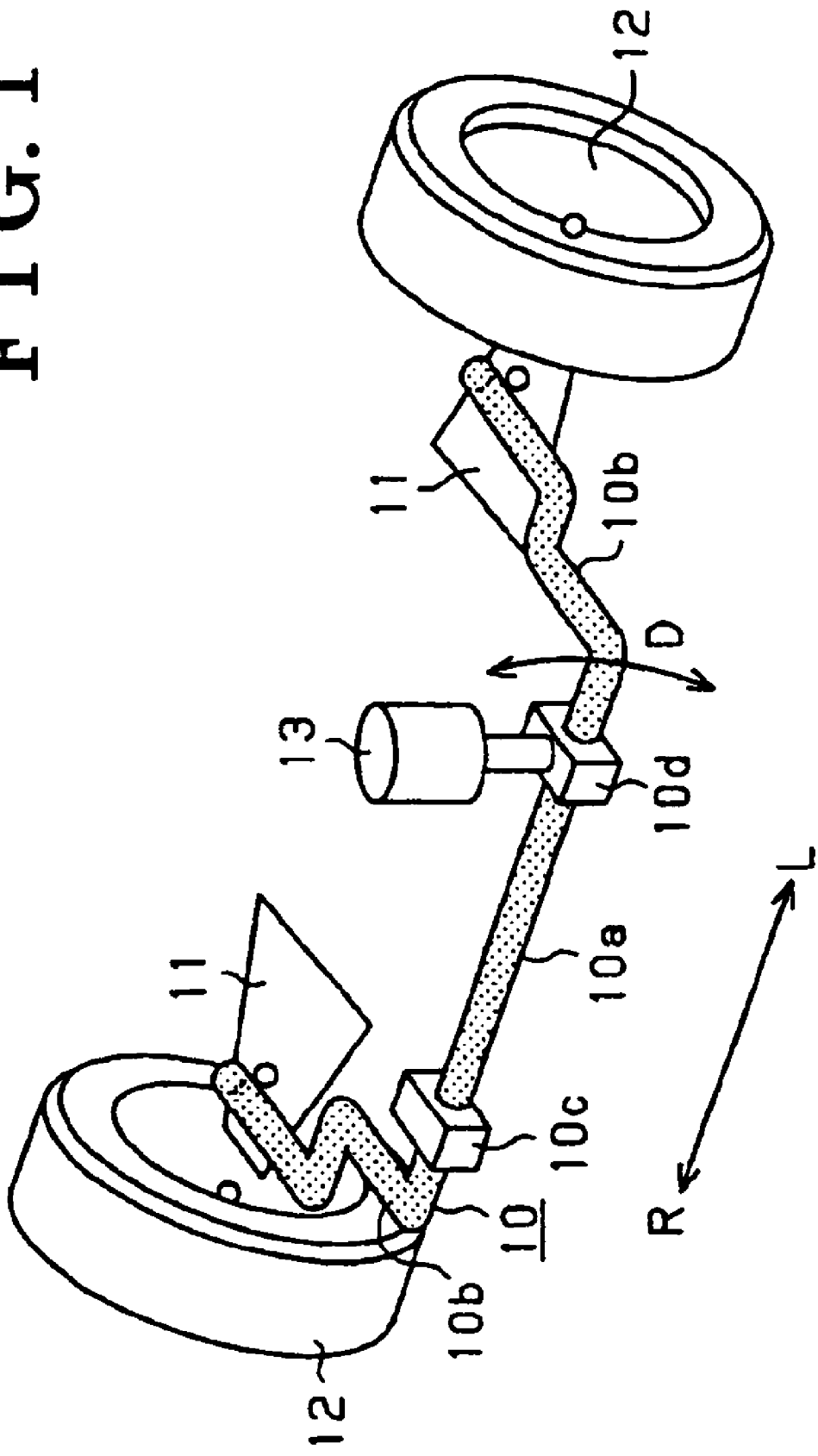
FIG. 1 represents a perspective view illustrating a front suspension of a vehicle to which the first embodiment of the present invention is employed.

A first embodiment of the present invention will be explained with reference to drawing figures. FIG. 1 represents a perspective view illustrating a front suspension of a vehicle, to which the embodiment of the present invention can be applied. As illustrated in the figure, the front suspension includes a stabilizer 10. The stabilizer 10 includes a stabilizer bar 10a extending in a vehicle width direction (RL direction in the figure) and end portions 10b extending from both ends of the stabilizer bar 10a and being bended. The stabilizer 10 is approximately U-shape.

Each end portion 10b is connected to a wheel 12 through a lower arm or the like. Further, a bearing portion 10c located at a position apart from the middle of the vehicle width in R direction of the stabilizer bar 10a is connected to a vehicle body (not illustrated) through a rod (not illustrated) or the like. Further, a movable portion 10d located at a position apart from the middle of the vehicle width in L direction of the stabilizer bar 10a is connected to the vehicle body through a front cylinder 13 serving as a cylinder. Accordingly, when the front cylinder 13 is actuated up and down (in the figure) to expand and contract, the stabilizer 10 swings on the bearing portion 10c in D direction illustrated in the figure.

On the other hand, a similar stabilizer is provided in a rear suspension provided at the rear of the vehicle. The stabilizer is provided in a similar way as in the front suspension except that a movable portion of the stabilizer is connected to the vehicle body through a rear cylinder 14 (illustrated in FIG. 2) serving as a cylinder similar to the front cylinder 13.

In other words, two stabilizers 10 are provided independently of each other in the front and at the rear of the vehicle. Then, a corresponding cylinder (a front cylinder 13 or a rear cylinder 14) is connected to each stabilizer 10.

In addition, as described later, whether a hydraulic oil serving as a hydraulic fluid in the front cylinder 13 and the rear cylinder 14 can transfer therebetween is selectively controlled. Then, for example, when the hydraulic oil is set or controlled possible to transfer between the front cylinder 13 and the rear cylinder 14, the front cylinder 13 and the rear cylinder 14 can be linked so that one of the front and rear cylinders 13, 14 expands, while the other of the front and rear cylinders 13, 14 contracts, which permits free axle joint motion. On the other hand, when the hydraulic oil is set or controlled impossible to transfer between the front cylinder 13 and the rear cylinder 14, the front cylinder 13 and the rear cylinder 14 cannot expand or contract, which reduces tilts of the vehicle body by twist of the stabilizer 10, for example, even when roll moment occurs at the vehicle.

Next, an oil pressure circuit 20 including the front cylinder 13 and the rear cylinder 14 will be explained with reference to FIG. 2. The front cylinder 13 includes a cylinder body 13a and a piston 13b. The cylinder body 13a is defined by the piston 13b into an upper chamber 13c and a lower chamber 13d. Similarly, the rear cylinder 14 includes a cylinder body 14a and a piston 14b. The cylinder body 14a is defined by the piston 14b into an upper chamber 14c and a lower chamber 14d.

In addition, upper ends of the cylinder body 13a and the cylinder body 14a are connected to the vehicle body. The piston 13b and the piston 14b are connected to the front stabilizer 10 (movable portion 10d) and the rear stabilizer 10 (movable portion 10d) respectively.

The upper chamber 13c of the front cylinder 13 and the upper chamber 14c of the rear cylinder are hydraulically connected through a hydraulic communication tube 21 serving as a hydraulic communication path. Similarly, the lower chamber 13d of the front cylinder 13 and the lower chamber 14d of the rear cylinder 14 are hydraulically connected through a hydraulic communication tube 22 serving as a hydraulic communication path. Then, control valves 23 and 24 are provided in the hydraulic communication tubes 21 and 22 respectively. An electronic control device ECU serving as a control device controls the control valves 23 and 24 to open or close the hydraulic communication tubes 21 and 22 respectively so that the hydraulic oil can or cannot transfer in the hydraulic communication tubes 21 and 22, in other words, between the front cylinder 13 and the rear cylinder 14.

Specifically, each control valve 23 and 24 includes a spool valve 25, an accumulator solenoid valve 26 (serving as a first solenoid valve in claim 1, and serving as a second solenoid valve in claim 9), a front-rear cut solenoid valve 27 (serving as a second solenoid valve in claim 1, and serving as a first solenoid valve in claim 8) and a pressure release solenoid valve 28 serving as a third solenoid valve. The hydraulic communication tube 21 includes a front hydraulic communication tube 21a and a rear hydraulic communication tube 21b. The front hydraulic communication tube 21a has a cross sectional area corresponding to a predetermined inner diameter D1 (for example, φ8) and hydraulically connects the upper chamber 13c and the spool valve 25 of the control valve 23. The rear hydraulic communication tube 21b has a cross sectional area corresponding to the inner diameter D1 and connects the upper chamber 14c and the spool valve 25. The hydraulic communication tube 22 includes a front hydraulic communication tube 22a and a rear hydraulic communication tube 22b. The front hydraulic communication tube 22a has a cross sectional area corresponding to the inner diameter D1 and connects the lower chamber 13d and the spool valve 25 of the control valve 24. The rear hydraulic communication tube 22b has a cross sectional area corresponding to the inner diameter D1 and connects the lower chamber 14d and the spool valve 25. The cross sectional area (inner diameter D1) of the hydraulic communication tubes 21 and 22 are determined corresponding to the amount of flow of the hydraulic oil (for example, 25 L/min) required between the front cylinder 13 and the rear cylinder 14.

In addition, in the embodiment, the control valves 23 and 24 have identical configuration each other except location in the oil pressure circuit 20. Accordingly, in following, one control valve, the control valve 23, will be explained. Explanation for another control valve, the control valve 24, will be omitted.

Figure 2:
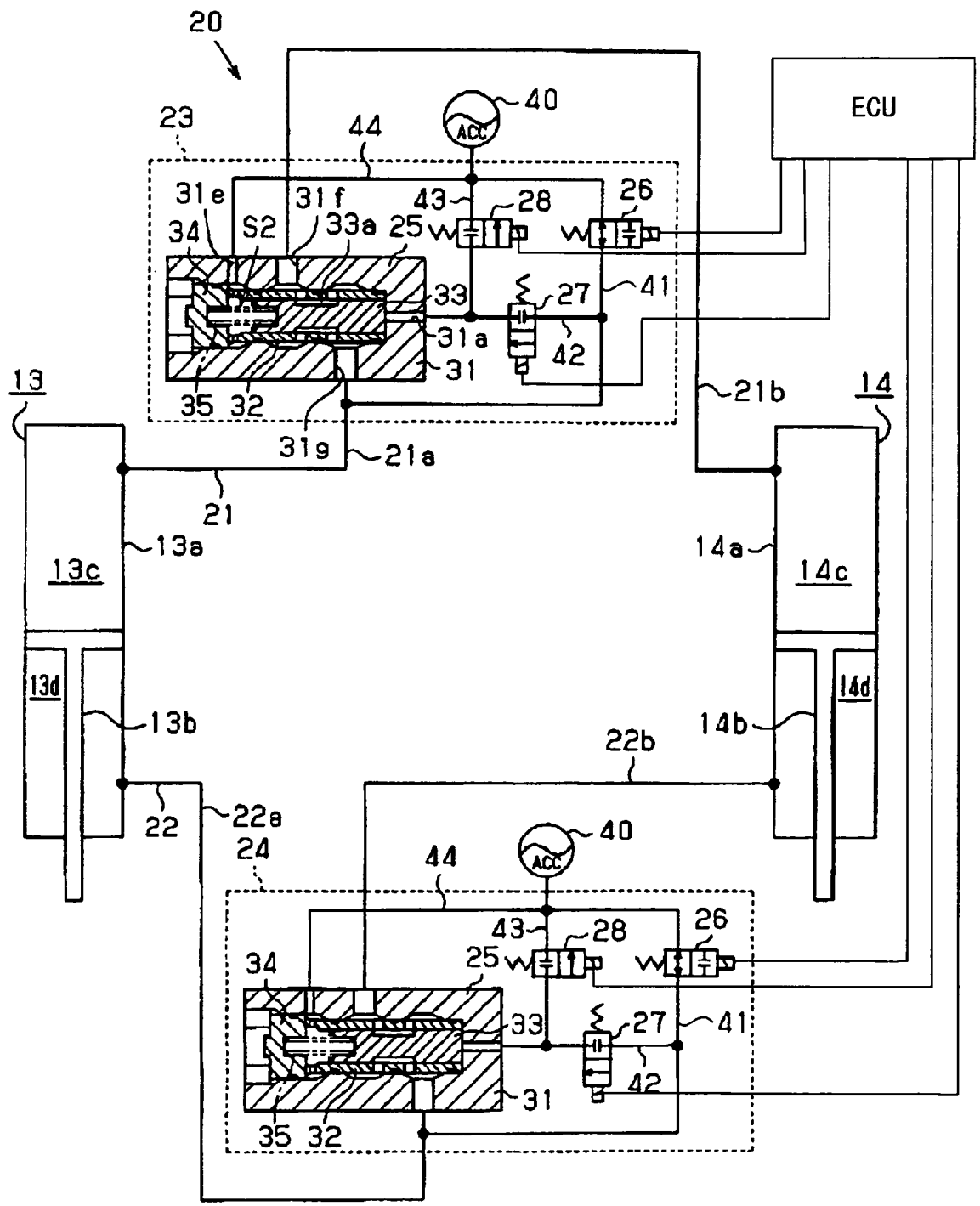
FIG. 2 represents a diagram illustrating an oil pressure circuit according to the first embodiment of the present invention.

As illustrated in FIG. 2, the spool valve 25 includes a housing 31, a sleeve 32, a spool 33, and a lid body 34. The housing 31 has an approximately cylindrical shape with a bottom. A bottom portion of the housing 31 includes a first hydraulic communication hole 31a provided through the bottom portion in an axial direction. The first hydraulic communication hole 31a has a cross sectional area corresponding to a predetermined inner diameter D2 (for example, φ3 to 3.2) smaller than that of the inner diameter D1.

Further, as also illustrated in FIG. 3, an inner surface of the housing 31 includes a plurality of (three) peripheral grooves 31b, 31c, and 31d provided along a peripheral direction and depressed toward a radial direction. The peripheral grooves 31b, 31c, and 31d are arranged in order described above along an axial direction from the open end side to the bottom portion side of the housing 31. A certain interval is provided between the peripheral grooves 31b and 31c, and 31c and 31d. Then, a second hydraulic communication hole 31e is formed corresponding to the peripheral groove 31b so as to penetrate a side wall portion of the housing 31 in a radial direction. The second hydraulic communication hole 31e has a cross sectional area corresponding to the inner diameter D2.

Further, a rear hydraulic communication hole 31f and a front hydraulic communication hole 31g are formed corresponding to the peripheral grooves 31c and 31d respectively so as to penetrate the side wall portion of the housing 31 in a radial direction. The rear hydraulic communication hole 31f and the front hydraulic communication hole 31g have a cross sectional area corresponding to the inner diameter D1. As illustrated in FIG. 2, the front hydraulic communication tube 21a of the hydraulic communication tube 21 is connected to the front hydraulic communication hole 31g. The rear hydraulic communication tube 21b of the hydraulic communication tube 21 is connected to the rear hydraulic communication hole 31f.

The sleeve 32 has an approximately cylindrical shape having an outer diameter of approximately the same length as the inner diameter of the housing 31. The sleeve 32 is inserted into the housing 31. As also illustrated in FIG. 3, the sleeve 32 has hydraulic communication holes 32a, 32b and 32c facing the peripheral grooves 31b, 31c and 31d respectively and penetrating the side wall portion of the housing 31 in a radial direction. The hydraulic communication hole 32a is provided every predetermined angle (for example, four hydraulic communication holes are provided). Similarly, the hydraulic communication hole 32b is provided every predetermined angle (for example, four hydraulic communication holes are provided). The hydraulic communication hole 32c is provided every predetermined angle (for example, four hydraulic communication holes are provided).

The spool 33 has an approximately column shape and has an outer diameter of approximately the same length as the inner diameter of the sleeve 32. The spool 33 is inserted into the sleeve 32. The outer diameter of the spool 33 (inner diameter of the sleeve 32) is determined to be larger than the inner diameter D1. Further, length of the spool 33 in an axial direction is determined to be shorter than that of the sleeve 32. An open end of the housing 31 accommodating the sleeve 32 and the spool 33 is closed by the lid body 34. The lid body 34 makes contact with an end surface of the sleeve 32. The second hydraulic communication hole 31e is open.

At an outer peripheral surface at the middle of the spool 33 in an axial direction, a peripheral groove 33a is provided along a peripheral direction and depressed in a direction toward a center. As illustrated in FIG. 2, the peripheral groove 33a is designed and arranged so that, when one end (right side end in FIG. 2) surface of the spool 33 makes contact with the bottom surface of the housing 31, the hydraulic communication holes 32b and 32c (grooves 31c and 31d) illustrated in FIG. 3 are hydraulically connected. Further, as illustrated in FIG. 3, the peripheral groove 33a is designed and arranged so that, when the other end surface (left end side in FIG. 3) of the spool 33 makes contact with a surface of the lid body 34 facing the spool 33, the hydraulic communication holes 32b and 32c (peripheral grooves 31c and 31d) are hydraulically disconnected.

Accordingly, when the one end surface (right side end in FIG. 2) of the spool 33 makes contact with the bottom surface of the housing 31, the front hydraulic communication hole 31g hydraulically connected to the front hydraulic communication tube 21a is hydraulically connected to the rear hydraulic communication hole 31f hydraulically connected to the rear hydraulic communication tube 21b through the peripheral groove 31d, the hydraulic communication hole 32c, the peripheral groove 33a, the hydraulic communication hole 32b and the peripheral groove 31c. Thus, the hydraulic communication tube 21 is opened, which allows transfer of the hydraulic oil in the hydraulic communication tube 21. On the other hand, when the other end surface (left side end in FIG. 3) of the spool 33 makes contact with the surface of the lid body 34 facing the spool 33, the hydraulic communication tube 21 is closed, which inhibits transfer of the hydraulic oil in the hydraulic communication tube 21.

In addition, as illustrated in FIG. 3, a first spool chamber S1 is defined by an inner surface of the sleeve 32, one end surface (right side end in FIG. 3) of the spool 33 and a bottom surface of the housing 31. The first spool chamber S1 is hydraulically connected to the first hydraulic communication hole 31a. Further, as illustrated in FIG. 2, a second spool chamber S2 is defined by an inner surface of the sleeve 32, the other end surface (left side end in FIG. 3) of the spool 33, and the surface of the lid body 34 facing the spool 33. The second spool chamber S2 is hydraulically connected to the second hydraulic communication hole 31e through the hydraulic communication holes 32a and the peripheral groove 31b illustrated in FIG. 3.

Further, the spool 33 includes a positioning hole 33b provided at the other end surface (left side end in FIG. 3) and depressed in an axial direction. On the other hand, the lid body 34 includes a positioning hole 34a provided at the surface facing the spool 33 and depressed in an axial direction. Then, a spool return spring 35 serving as a biasing member is provided between the spool 33 and the lid body 34 defining the second spool chamber S2. Position of one end of the spool return spring 35 is determined by the positioning hole 33b, and the other end of the spool return spring 35 is determined by the positioning hole 34a. The spool return spring 35 biases the spool 33 toward the bottom surface (toward the first spool chamber S1) of the housing 31. Accordingly, generally the spool 33 makes contact with the bottom surface of the housing 31 with biasing force by the spool return spring 35. In this time, the hydraulic communication holes 32b, 32c (peripheral grooves 31c, 31d) are hydraulically connected through the peripheral groove 33a.

The accumulator solenoid valve 26 is provided in a first hydraulic communication passage 41 hydraulically connecting the front hydraulic communication tube 21a and an accumulator 40. The accumulator solenoid valve 26 has a cross sectional area corresponding to the inner diameter D2. The accumulator solenoid valve 26 is a normally open type of valve, which opens the first hydraulic communication passage 41 by means of a return spring when not energized. The accumulator solenoid valve 26 is controlled by an electronic control device ECU to selectively open or close the first hydraulic communication passage 41.

A second hydraulic communication passage 42 is hydraulically connected to the first hydraulic communication passage 41 between the accumulator solenoid valve 26 and the front hydraulic communication tube 21a. The second hydraulic communication passage 42 is hydraulically connected to the first hydraulic communication hole 31a (first spool chamber S1). The second hydraulic communication passage 42 has a cross sectional area corresponding to the inner diameter D2.

In other words, the second hydraulic communication passage 42 substantially hydraulically connects the front hydraulic communication tube 21a of the hydraulic communication tube 21 and the first spool chamber S1 through the first hydraulic communication passage 41. Then, the front-rear cut solenoid valve 27 is provided in the second hydraulic communication passage 42. The front-rear cut solenoid valve 27 is a normally close type of valve, which closes the second hydraulic communication passage 42 by means of a return spring when not energized. The front-rear cut solenoid valve 27 is controlled by the electronic control device ECU to selectively open or close the second hydraulic communication passage 42.

A third hydraulic communication passage 43 is hydraulically connected to the second hydraulic communication passage 42 between the front-rear cut solenoid valve 27 and the first hydraulic communication hole 31a (first spool chamber S1). The third hydraulic communication passage 43 is hydraulically connected to the accumulator 40. The third hydraulic communication passage 43 has a cross sectional area corresponding to the inner diameter D2. In other words, the third hydraulic communication passage 43 substantially hydraulically connects the first spool chamber S1 and the accumulator 40 through the second hydraulic communication passage 42. Then, the pressure release solenoid valve 28 is provided in the third hydraulic communication passage 43. The pressure release solenoid valve 28 is a normally close type of valve, which closes the third hydraulic communication passage 43 by means of a return spring when not energized. The pressure release solenoid valve 28 is controlled by the electronic control device ECU to selectively open or close the third hydraulic communication passage 43.

Further, the second hydraulic communication hole 31e and the accumulator 40 are hydraulically connected through an accumulator communication passage 44. The accumulator communication passage has a cross sectional area corresponding to the inner diameter D2. In other words, the second spool chamber S2 is hydraulically connected to the accumulator 40 through the hydraulic communication holes 32a, the peripheral groove 31b, the second hydraulic communication hole 31e (illustrated in FIG. 3) and the accumulator communication passage 44.

Next, controls of the control valve 23 for opening and closing the hydraulic communication tube 21 will be explained with reference to a step chart illustrated in FIG. 4. In addition, in initial state before the controls are implemented, as illustrated in FIG. 2, the spool 33 is located in the spool chamber S1 side and makes contact with the bottom surface of the housing 31. Accordingly, the spool valve 25 opens the hydraulic communication tube 21. Further, the accumulator solenoid valve 26, the front-rear cut solenoid valve 27 and the pressure release solenoid valve 28 are not energized. In this situation, the accumulator solenoid valve 26 opens the first hydraulic communication passage 41, the front-rear cut solenoid valve 27 closes the second hydraulic communication passage 42, and the pressure release solenoid valve closes the third hydraulic communication passage 43. In this state, an accumulator system and a cylinder system are hydraulically connected. In other words, the accumulator 40 and the hydraulic communication tube 21 (the upper chamber 13c of the front cylinder 13 and the upper chamber 14c of the rear cylinder 14) are hydraulically connected through the accumulator solenoid valve 26 and the spool valve 25, or the like. The configuration described above is designed in order for absorbing thermal expansion or contraction of the hydraulic oil in the hydraulic communication tube 21 or the like by the accumulator 40. In addition, this state is set when an engine of the vehicle stops or when pressure of the hydraulic oil is low.

In this state, when a mode of the vehicle is transferred to a front-rear cylinders cut mode by the electronic control device ECU corresponding to a turning state of the vehicle, in step 1, the accumulator solenoid valve 26 closes the first hydraulic communication passage 41. Thus, the accumulator system and the cylinder system are hydraulically disconnected. In other words, the accumulator 40 and the hydraulic communication tube 21 (the upper chamber 13c of the front cylinder 13 and the upper chamber 14c of the rear cylinder 14) are hydraulically disconnected.

Next, in step 2, the front-rear cut solenoid valve 27 opens the second hydraulic communication passage 42. Then, the hydraulic oil of high pressure (higher pressure than a set pressure of the accumulator 40, the set pressure of the accumulator is, for example, 2.7 to 3.2 MPa) in the hydraulic communication tube 21 (the upper chamber 13c of the front cylinder 13 and the upper chamber 14c of the rear cylinder 14) is introduced into the first spool chamber S1 through the second hydraulic communication passage 42 or the like. In accordance with this, the spool 33 is moved toward the second spool chamber S2 against biasing force of the spool return spring 35, which closes the hydraulic communication tube 21.

Then, after a predetermined time t1 passes from this state, in step 3, the front-rear cut solenoid valve 27 closes the second hydraulic communication passage 42. In this situation, the first spool chamber S1 is kept to be filled with the hydraulic oil. Accordingly, the spool 33 is kept to be located in the second spool chamber S2, which keeps the hydraulic communication tube 21 closed. Time (a predetermined time t1) during which the front-rear cut solenoid valve 27 need to be energized for filling the first spool chamber S1 with the hydraulic oil is, for example, few seconds. Thus, electric consumption can be reduced.

On the other hand, in the state that the hydraulic communication tube 21 is closed, when the mode of the vehicle is transferred into a front-rear cylinders connection recovery mode by the electronic control device ECU corresponding to an end of the turning state of the vehicle, in step 4, the pressure release solenoid valve 28 opens the third hydraulic communication passage 43. Then, when the first spool chamber S1 is hydraulically connected to the accumulator 40, the spool 33 moves toward the first spool chamber S1 by biasing force of the spool return spring 35. Then, the hydraulic oil filled in the first spool chamber S1 is released to the accumulator 40. In accordance with this, the hydraulic communication tube 21 is opened.

Then, after a predetermined time t2 passed from this state, the pressure release solenoid valve 28 closes the third hydraulic communication passage 43. Further, in step 5, the accumulator solenoid valve 26 opens the first hydraulic communication passage 41. Thus, the accumulator system and the cylinder system are hydraulically connected, recovering the initial state. In other words, the accumulator 40 and the hydraulic communication tube 21 (the upper chamber 13c of the front cylinder 13 and the upper chamber 14c of the rear cylinder 14) are hydraulically connected again. Time (a predetermined time t2) during which the pressure release solenoid valve 28 need to be energized for introducing the hydraulic oil filled in the first spool chamber S1 into the accumulator 40 is, for example, few seconds. Thus, electric consumption can be reduced.

In addition, configurations or operations of the control valve 24 provided in the hydraulic communication tube 22 is similar to configurations or operations of the control valve 23 except that terms "upper chamber 13c", "upper chamber 14c", "front hydraulic communication tube 21a" and "rear hydraulic communication tube 21b" are respectively replaced by following terms "lower chamber 13d", "lower chamber 14d", "front hydraulic communication tube 22a" and "rear hydraulic communication tube 22b". Accordingly, explanation of the control valve 24 will be omitted. These control valves 23 and 24 are controlled by the electronic control device ECU to open or close the hydraulic communication tubes 21 and 22 basically simultaneously.

Next, a relation between the state of the vehicle and open-close control of the hydraulic communication tubes 21, 22 by the electronic control device ECU will be explained summarily. First, explanation will be made supposing that the control valves 23, 24 are in the initial state described above. In this state, the control valves 23 and 24 (spool valve 25) open the hydraulic communication tubes 21 and 22. Accordingly, the hydraulic oil can transfer in the hydraulic communication tubes 21 and 22, in other words, between the front cylinder 13 and the rear cylinder 14. Then, thermal expansion and contraction of the hydraulic oil in the front cylinder 13, the rear cylinder 14 and the hydraulic communication tubes 21 and 22 are absorbed by the accumulator 40.

In this state, when the electronic control device ECU judges that the vehicle is in the state of turning on the basis of a signal such as a steering angle, vehicle speed, and rolling load, the electronic control device ECU changes the mode of the vehicle into the front-rear cylinders cut mode. Then, according to the front-rear cylinders cut mode, the electronic control device ECU controls the control valves 23 and 24 (the accumulator solenoid valve 26, the front-rear cut solenoid valve 27 and the pressure release solenoid valve 28) to close the hydraulic communication tubes 21 and 22. Thus, expansion and contraction of the front cylinder 13 and the rear cylinder 14 are prevented, and tilt of the vehicle body caused by roll moment can be reduced by twisting of the stabilizer 10. In particular, when the vehicle is in the state of turning, for example, even when balance between loads applied to the front cylinder 13 and to the rear cylinder 14 is changed because of condition of a road surface on which the vehicle is running, the working oil does not transfer between the front cylinder 13 and the rear cylinder 14. Accordingly, posture of the vehicle while the vehicle is turning can be stably controlled.

On the other hand, when the electronic control device judges that the state of turning of the vehicle ends on the basis of a signal such as a steering angle of the vehicle, a vehicle speed and rolling load, the electronic control device ECU changes the mode of the vehicle into the front-rear cylinders connection recovery mode. Then, according to the front-rear cylinders connection recovery mode, the electronic control device ECU controls the control valves 23 and 24 (the accumulator solenoid valve 26, the front-rear cut solenoid valve 27 and the pressure release solenoid valve 28) to open the hydraulic communication tubes 21 and 22.

As described above, according to the embodiment of the present invention, following effects can be obtained.

First, according to the embodiment of the present invention, the hydraulic communication tubes 21 and 22 can be opened or closed through the spool valve 25 by selectively opening or closing the first hydraulic communication passage 41, the second hydraulic communication passage 42 and the third hydraulic communication passage 43 having a cross sectional area (a cross sectional area corresponding to the inner diameter D2) smaller than that of the hydraulic communication tubes 21 and 22 by means of opening or closing the accumulator solenoid valve 26, the front-rear cut solenoid valve 27 and the pressure release solenoid valve 28 controlled by the electronic control device. Accordingly, electromagnetic force required for the solenoid valves 26 to 28 can be smaller than that required in the case where the hydraulic communication tubes 21 and 22 are directly opened or closed by a large poppet-type solenoid valve. Thus, apparatus can be downsized overall.

Further, because electromagnetic force required for the solenoid valves 26 to 28 can be smaller, the required amount of electric power supplied thereto can also be smaller. Further, because a combination of the spool valve 25 and the solenoid valves 26 to 28 can replace, for example, a large poppet-type solenoid valve, cost can be cut.

Second, in the embodiment, the accumulator solenoid valve 26 opens the first hydraulic communication passage 41 without electricity being supplied. Thus, the hydraulic communication tubes 21 and 22 are connected to the accumulator 40. Accordingly, for example when the vehicle is parking, the hydraulic communication tubes 21 and 22 and the accumulator 40 are hydraulically connected without electricity consumption by the accumulator solenoid valve 26. Therefore, oil pressure of the hydraulic communication tubes 21 and 22 (the front cylinder 13 and the rear cylinder 14) can be kept approximately constant without electricity consumption. Then, thermal expansion or contraction of the hydraulic oil in the hydraulic communication tubes 21 and 22 or the like influenced from such as a condition of surroundings can be absorbed by the accumulator 40.

Third, in the embodiment, electricity supplied to the front-rear cut solenoid valve 27 for opening the second hydraulic communication passage 42 is required basically only when the hydraulic oil of high pressure in the front cylinder 13 and the rear cylinder 14 (hydraulic communication tubes 21 and 22) is introduced into the first spool chamber S1. Cooperation with the pressure release solenoid valve 28 can make it unnecessary to supply electricity to the front-rear cut solenoid valve 27, for example, even for keeping the state (the state in which the hydraulic communication tubes 21 and 22 are closed by the spool valve 25) of the first spool chamber S1 filled with the hydraulic oil. Accordingly, electricity consumption by the front-rear cut solenoid valve 27 can be reduced.

Fourth, in the embodiment, electricity supplied to the pressure-release solenoid valve 28 for opening the third hydraulic communication passage 43 is required basically only when the hydraulic oil introduced into the first spool chamber S1 is released to the accumulator 40. Accordingly, electricity consumption by the pressure-release solenoid valve 28 can be reduced.

In addition, the hydraulic communication tube 21, the first spool chamber S1, and the front-rear cut solenoid valve 27 correspond to a main hydraulic passage, a spool chamber, and a first solenoid valve described in claim 8 respectively. Further, the hydraulic communication passage 42 and a part of the hydraulic communication passage 41 of the front hydraulic communication tube 21a side defined from an intersection of the hydraulic communication passage 41 with the hydraulic communication passage 42 correspond to a first sub hydraulic communication passage described in claim 8. And, the third hydraulic communication passage 43 and the pressure release solenoid valve 28 correspond to a discharging mechanism described in claim 8. Then, a part of the hydraulic communication passage 41 of the accumulator 40 side defined from an intersection of the hydraulic communication passage 41 with the hydraulic communication passage 42 corresponds to a second sub hydraulic communication passage described in claim 9. Further, the accumulator solenoid valve 26 corresponds to a second solenoid valve described in claim 9. Further, the third hydraulic communication passage 43 and the pressure release solenoid valve 28 correspond to a third sub hydraulic communication passage and a third solenoid valve described in claim 10 respectively.

Next, a second embodiment of the present invention will be explained with reference to FIG. 5. Here, the second embodiment of the present invention is similar to the first embodiment of the present invention except that the control valve 23 (or the control valve 24) provided in the hydraulic communication tube 21 (or the hydraulic communication tube 22) is replaced by a control valve 50 differently configured from the control valve 23 (or the control valve 24) described above. Accordingly, the same numbers are applied to similar parts, and detailed explanations of the similar parts will be omitted. Further, in following, a control valve 50 provided in one hydraulic communication tube 21 will be representatively explained.

Figure 5:
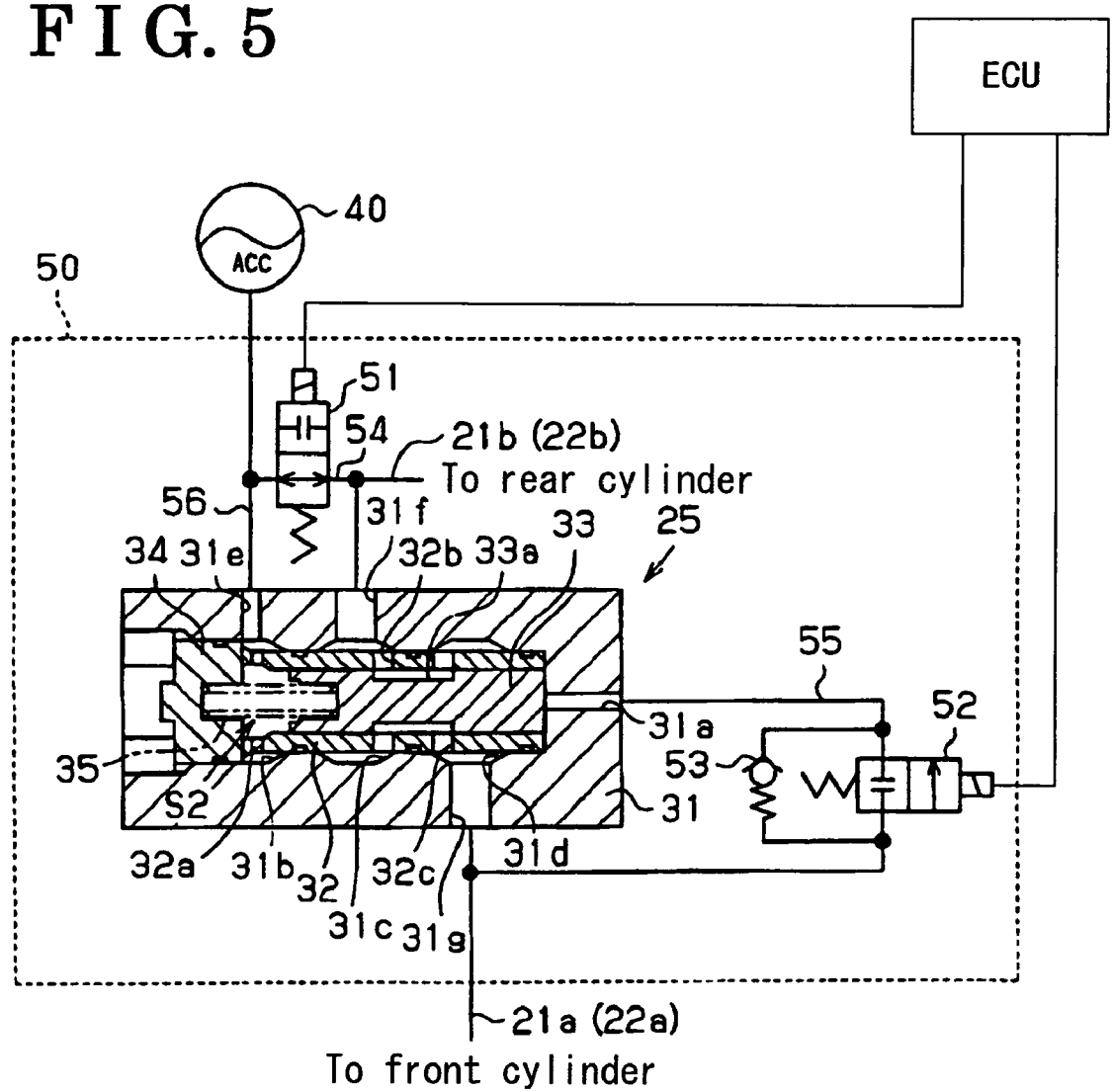
FIG. 5 represents a partial diagram illustrating an oil pressure circuit according to a second embodiment of the present invention.

As illustrated in FIG. 5, according to the embodiment, the control valve 50 includes the spool valve 25, an accumulator solenoid valve 51 serving as the first solenoid valve, a front-rear cut solenoid valve 52 serving as the second solenoid valve, and a check valve 53.

The accumulator solenoid valve 51 is provided in a first hydraulic communication passage 54 hydraulically connecting the rear hydraulic communication tube 21b of the hydraulic communication tube 21 and the accumulator 40. The accumulator solenoid valve 51 has a cross sectional area corresponding to the inner diameter D2. The accumulator solenoid valve 51 is a normally open type of valve, which opens the first hydraulic communication passage 54 by means of a return spring when not energized. The accumulator solenoid valve 51 is controlled by the electronic control device ECU to selectively open or close the first hydraulic communication passage 54.

The front-rear cut solenoid valve 52 is provided in a second hydraulic communication passage 55 hydraulically connecting the front hydraulic communication tube 21a of the hydraulic communication tube 21 and the first hydraulic communication hole 31a (the first spool chamber S1, illustrated in FIG. 3). The front-rear cut solenoid valve 52 has a cross sectional area corresponding to the inner diameter D2. The front-rear cut solenoid valve 52 is a normally close type of valve, which closes the second hydraulic communication passage 55 by means of a return spring when not energized. The front-rear cut solenoid valve 52 is controlled by the electronic control device ECU to selectively open or close the second hydraulic communication passage 55.

The check valve 53 is provided in the second hydraulic communication passage 55, bypassing the front-rear cut solenoid valve 52. A forward direction of the check valve is set to a direction from the first hydraulic communication hole 31a (first spool chamber S1) to the front hydraulic communication tube 21a. Opening pressure of the check valve 53 is set lower than operational pressure of the spool 33.

Further, the second hydraulic communication hole 31e and the accumulator 40 are hydraulically connected through an accumulator communication passage 56 having a cross sectional area corresponding to the inner diameter D2. In other words, the second spool chamber S2 is hydraulically connected to the accumulator 40 through the hydraulic communication holes 32a, the peripheral groove 31b, the second hydraulic communication hole 31e and the accumulator communication passage 56.

Next, controls of the control valve 50 configured as described above for opening and closing the hydraulic communication tube 21 will be explained. In addition, in initial state before the controls are implemented, as illustrated in FIG. 5, the spool 33 is located in the spool chamber S1 side and makes contact with the bottom surface of the housing 31. Accordingly, the spool valve 25 opens the hydraulic communication tube 21. Further, the accumulator solenoid valve 51 and the front-rear cut solenoid valve 52 are not energized. In this situation, the accumulator solenoid valve 51 opens the first hydraulic communication passage 54, the front-rear cut solenoid valve 52 closes the second hydraulic communication passage 55. In this state, an accumulator system and a cylinder system are hydraulically connected. In other words, the accumulator 40 and the hydraulic communication tube 21 (the upper chamber 13c of the front cylinder 13 and the upper chamber 14c of the rear cylinder 14) are hydraulically connected through the accumulator solenoid valve 51 and the spool valve 25 or the like.

In this state, when a mode of the vehicle is transferred to a front-rear cylinders cut mode by the electronic control device ECU corresponding to the state of turning of the vehicle, the accumulator solenoid valve 51 closes the first hydraulic communication passage 54. Thus, the accumulator system and the cylinder system are hydraulically disconnected. In other words, the accumulator 40 and the hydraulic communication tube 21 (the upper chamber 13c of the front cylinder 13 and the upper chamber 14c of the rear cylinder 14) are hydraulically disconnected.

Next, the front-rear cut solenoid valve 52 opens the second hydraulic communication passage 55. Then, the hydraulic oil of high pressure (higher pressure than a set pressure of the accumulator 40) in the hydraulic communication tube 21 (the upper chamber 13c of the front cylinder 13 and the upper chamber 14c of the rear cylinder 14) is introduced into the first spool chamber S1 through the second hydraulic communication passage 55 or the like. In accordance with this, the spool 33 is moved toward the second spool chamber S2 against biasing force of the spool return spring 35, which closes the hydraulic communication tube 21.

Then, after a predetermined time t11 passes from this state, the front-rear cut solenoid valve 52 closes the second hydraulic communication passage 55. In this situation, the first spool chamber S1 is kept to be filled with the hydraulic oil. Accordingly, the spool 33 is kept to be located in the second spool chamber S2 side, which keeps the hydraulic communication tube 21 closed. Time (a predetermined time t11) during which the front-rear cut solenoid valve 52 need to be energized for filling the first spool chamber S1 with the hydraulic oil is, for example, few seconds. Thus, electric consumption can be reduced. In addition, in this state, because the oil pressure of the hydraulic oil introduced into the first spool chamber S1 is similar to or less than that in the hydraulic communication tube 21, the introduced hydraulic oil does not ejected through the check valve 53.

On the other hand, in the state that the hydraulic communication tube 21 is closed, when the state of turning of the vehicle ends and the oil pressure in the hydraulic communication tube 21 (the upper chamber 13c of the front cylinder 13 and the upper chamber 14c of the rear cylinder 14) goes down to approximately set pressure of the accumulator 40, the hydraulic oil of high pressure introduced into the first spool chamber S1 is released into the hydraulic communication tube 21 (the upper chamber 13c of the front cylinder 13 and the upper chamber 14c of the rear cylinder 14) through the check valve 53 provided in the second hydraulic communication passage 55.

Then, the spool 33 is moved toward the first spool chamber S1 by biasing force of the spool return spring 35. Thus, the hydraulic communication tube 21 is opened. Then, in this state, the accumulator solenoid valve 51 opens the first hydraulic communication passage 54. Thus, the accumulator system and the cylinder system are hydraulically connected, recovering to the initial state. In other words, the accumulator 40 and the hydraulic communication tube 21 (the upper chamber 13c of the front cylinder 13 and the upper chamber 14c of the rear cylinder 14) are hydraulically connected again.

In addition, configurations or operations of a control valve 50 provided in the hydraulic communication tube 22 is similar to configurations or operations of the control valve 50 provided in the hydraulic communication tube 21 except that terms "upper chamber 13c", "upper chamber 14c", "front hydraulic communication tube 21a" and "rear hydraulic communication tube 21b" are respectively replaced by terms "lower chamber 13d", "lower chamber 14d", "front hydraulic communication tube 22a" and "rear hydraulic communication tube 22b". Accordingly, explanation of the control valve 50 provided in the hydraulic communication tube 22 will be omitted. The control valves 50 are controlled by the electronic control device to open or close the hydraulic communication tubes 21 and 22 basically simultaneously.

Next, a relation between the state of the vehicle and open-close control of the hydraulic communication tubes 21, 22 by the electronic control device ECU will be explained summarily. First, explanation will be made supposing that the control valves 50 are in the initial state described above.

In this state, when the electronic control device judges that the vehicle is in the state of turning on the basis of a signal such as a steering angle, vehicle speed, and rolling load, the electronic control device ECU changes the mode of the vehicle into the front-rear cylinders cut mode. Then, according to the front-rear cylinders cut mode, the electronic control device ECU controls the control valves 50 (the accumulator solenoid valve 51 and the front-rear cut solenoid valve 52) to close the hydraulic communication tubes 21 and 22. Thus, expansion and contraction of the front cylinder 13 and the rear cylinder 14 can be prevented, and tilt of the vehicle body caused by the roll moment can be reduced by twist of the stabilizer 10. In particular, when the vehicle is in the state of turning, for example, even when balance between loads applied to the front cylinder 13 and to the rear cylinder 14 is changed by influence from condition of a road surface on which the vehicle is running or the like, the hydraulic oil does not transfer between the front cylinder 13 and the rear cylinder 14. Accordingly, posture of the vehicle when the vehicle is turning can be stably controlled.

On the other hand, for example, when the state of the turning of the vehicle ends and the oil pressure in the hydraulic communication tubes 21 and 22 (the front cylinder 13 and the rear cylinder 14) lowers to approximately set pressure of the accumulator 40, the hydraulic oil of high pressure filled in the first spool chamber S1 is automatically released into the hydraulic communication tubes 21 and 22 (the front cylinder 13 and the rear cylinder 14) through the check valve 53 provided in the second hydraulic communication passage 55. Then, the spool 33 is transferred toward the first spool chamber S1 by biasing force of the spool return spring 35, which opens the hydraulic communication tubes 21 and 22.

As described above, according to the embodiment of the present invention, in addition to the second and third effects obtained in the first embodiment of the present invention, a following effect can be obtained. First, according to the embodiment of the present invention, the hydraulic communication tubes 21 and 22 can be opened or closed through the spool valve 25 by selectively opening or closing the first hydraulic communication passage 54 and the second hydraulic communication passage 55 having a cross sectional area (a cross sectional area corresponding to the inner diameter D2) smaller than that of the hydraulic communication tubes 21 and 22 by means of opening or closing the accumulator solenoid valve 51 and the front-rear cut solenoid valve 52 controlled by the electronic control device ECU. Accordingly, electromagnetic force required for the solenoid valves 51 and 52 can be smaller than that required in the case where the hydraulic communication tubes 21 and 22 are directly opened or closed by a large poppet-type solenoid valve. Thus, overall apparatus can be downsized. Further, because electromagnetic force required for the solenoid valves 51 and 52 is smaller, the required amount of electric power supplied thereto can be also be smaller.

Further, in the state that the hydraulic communication tubes 21 and 22 are closed, the hydraulic oil of high pressure filled in the first spool chamber S1 can automatically be released into the hydraulic communication tubes 21 and 22 through the check valve 53 when the oil pressure in the hydraulic communication tubes 21 and 22 (the front cylinder 13 and the rear cylinder 14) lowers to approximately set pressure of the accumulator 40. Accordingly, an oil pressure circuit can be simpler than, for example, that in the case where similar and dedicated solenoid valve is employed.

Further, the front-rear cut solenoid valve 52 and the check valve 53 for bypassing the front-rear cut solenoid valve 52 can be made into a unit in a relatively simple way, which can contribute to reduce the number of parts and to increase degree of freedom for arrangement.

Further, combination of the spool valve 25, the solenoid valves 51 and 52, and the check valve 53 can replace, for example, a large poppet-type solenoid valve, which can cut cost.

In addition, in the second embodiment, the hydraulic communication tube 21, the first spool chamber S1, the second hydraulic communication passage 55, the front-rear cut solenoid valve 52, and the check valve 53 correspond to a main hydraulic communication path, a spool chamber, a first sub hydraulic communication passage, a first solenoid valve, and a discharging mechanism described in claim 8 respectively. Further, the first hydraulic communication passage 54 and a part of accumulator communication passage 56 of the accumulator 40 side defined from an intersection of the accumulator communication passage 56 with the first hydraulic communication passage 54 correspond to a second sub path described in claim 9, and the accumulator solenoid valve 51 corresponds to a second solenoid valve described in claim 9.

In addition, the embodiments described above can be modified as follows. The spool valve 25, the accumulator solenoid valve 26, the front-rear cut solenoid valve 27 and the pressure release solenoid valve 28 described in the first embodiment of the present invention can be integrally provided in a housing which can accommodate them. In this case, the first to third hydraulic communication passages 41 to 43 or the like can be formed at the housing by means of drilling. Further, the control valves 23 and 24 can be integrally provided in a housing which can accommodate them.

The spool valve 25, the accumulator solenoid valve 51, the front-rear cut solenoid valve 52 and the check valve 53 described in the second embodiment of the present invention can integrally be provided in a housing which can accommodate them. In this case, the first and second hydraulic communication passages 54 and 55 or the like can be formed at the housing by means of drilling. Further, the control valves 50 can integrally be provided in a housing which can accommodate them.

According to the first and second embodiments, the housing of the spool valve is configured from the housing 31, the sleeve 32 and the lid body 34. However, it is not limited. Another configuration of the spool valve 25 can be employed. According to the first and second embodiments, the hydraulic communication tubes 21 and 22 are opened or closed by moving the spool 33 relative to the fixed sleeve 32 or the like (housing). However, it is not limited. The hydraulic communication tubes 21 and 22 can be opened or closed by, for example, moving the housing (the sleeve 32 or the like) relative to the fixed spool.

In the first embodiment, each of the control valves 23 and 24 employs a combination of the spool valve 25, the accumulator solenoid valve 26, the front-rear cut solenoid valve 27, and the pressure release solenoid valve 28. However, it is not limited. It is acceptable that only one of the control valves 23 and 24 employs such combination described above. In the second embodiment, each of the control valves 50 employs a combination of the spool valve 25, the accumulator solenoid valve 51, the front-rear cut solenoid valve 52, and the check valve 53. However, it is not limited. It is acceptable that only one of the control valves 50 employs such combination described above.

The front cylinder 13 and/or the rear cylinder 14 in the first and second embodiments may be provided upside down. In other words, lower end(s) of the cylinder body 13a and/or 14a can be connected to the stabilizer 10 (movable portion 10d), and the piston(s) 13b and/or 14b can be connected to the vehicle body.

A cross section(s) of the hydraulic communication tubes 21 and 22, the first to third hydraulic communication passages 41 to 43, the first and second hydraulic communication passages 54 and 55, and the accumulator communication passage 44 and 56, or the like, described in the first and/or second embodiment(s) of the present invention, is/are not limited to circular, but can be, for example, rectangular.

The number of the stabilizers 10 is not limited to two, but can be any plural number. Further, the number of the cylinders (the front cylinder 13 and the rear cylinder 14) connected to the stabilizer 10 is not limited to two, but can be any plural number.

A configuration of connection between the stabilizer 10 and the wheel 12, or between the stabilizer 10 and the vehicle body, described above, is one example. A bracket or the like can be employed for the connection described above.

According to a first aspect of the present invention, a hydraulic pressure control apparatus for a plurality of stabilizers provided in a vehicle for controlling hydraulic fluid in a hydraulic communication path hydraulically connecting a plurality of cylinders each operatively connected to each of the plurality of stabilizers includes a spool valve provided in the hydraulic communication path, the spool valve including a housing, a spool movably accommodated in the housing, a first spool chamber defined by the housing and one end of the spool, a second spool chamber defined by the housing and the other end of the spool and hydraulically connected to an accumulator, and a biasing member provided in the second spool chamber for biasing the spool toward the first spool chamber, and the spool relatively moved in the housing selectively toward the first spool chamber or toward the second spool chamber to selectively open or close the hydraulic communication path, a first hydraulic communication passage hydraulically connecting the accumulator and the hydraulic communication path and having a cross sectional area smaller than that of the hydraulic communication path, a first solenoid valve provided in the first hydraulic communication passage for selectively opening or closing the first hydraulic communication passage, a second hydraulic communication passage hydraulically connecting the first spool chamber and the hydraulic communication path and having a cross sectional area smaller than that of the hydraulic communication path, a second solenoid valve provided in the second hydraulic communication passage for selectively opening or closing the second hydraulic communication passage, a third hydraulic communication passage hydraulically connecting the accumulator and the first spool chamber and having a cross sectional area smaller than that of the hydraulic communication path, a third solenoid valve provided in the third hydraulic communication passage for selectively opening or closing the third hydraulic communication passage, and a control device for controlling the first, second and third solenoid valves to open and close.

According to a second aspect of the present invention, the third solenoid valve is a normally close type of valve which normally closes the third hydraulic communication passage when not energized.

According to a third aspect of the present invention, a hydraulic pressure control apparatus for a plurality of stabilizers provided in a vehicle for controlling hydraulic fluid in a hydraulic communication path hydraulically connecting a plurality of cylinders each operatively connected to each of the plurality of stabilizers includes a spool valve provided in the hydraulic communication path, the spool valve including a housing, a spool movably accommodated in the housing, a first spool chamber defined by the housing and one end of the spool, a second spool chamber defined by the housing and the other end of the spool and hydraulically connected to an accumulator, and a biasing member provided in the second spool chamber for biasing the spool toward the first spool chamber, and the spool relatively moved in the housing selectively toward the first spool chamber or toward the second spool chamber to selectively open or close the hydraulic communication path, a first hydraulic communication passage hydraulically connecting the accumulator and the hydraulic communication path and having a cross sectional area smaller than that of the hydraulic communication path, a first solenoid valve provided in the first hydraulic communication passage for selectively opening or closing the first hydraulic communication passage, a second hydraulic communication passage hydraulically connecting the first spool chamber and the hydraulic communication path and having a cross sectional area smaller than that of the hydraulic communication path, a second solenoid valve provided in the second hydraulic communication passage for selectively opening or closing the second hydraulic communication passage, a check valve provided in the second hydraulic communication passage for bypassing the second solenoid valve from the first spool chamber to the hydraulic communication path as a forward direction, and a control device for controlling the first and second solenoid valves to open and close.

According to a fourth aspect of the present invention, the first solenoid valve is a normally open type of valve which normally opens the first hydraulic communication passage when not energized.

According to a fifth aspect of the present invention, the second solenoid valve is a normally close type of valve which normally closes the second hydraulic communication passage when not energized.

According to the first aspect of the present invention, for example, in a situation where the spool valve (spool) opens the hydraulic communication path and where the first solenoid valve and the third solenoid valve closes the first hydraulic communication passage and the third hydraulic communication passage, when the second solenoid valve opens the second hydraulic communication passage, the hydraulic fluid of high pressure (higher pressure than a set pressure of the accumulator) in the cylinder (the hydraulic communication path) is introduced into the first spool chamber through the second hydraulic communication passage. In accordance with that, the spool is relatively moved toward the second spool chamber against the biasing member and closes the hydraulic communication path.

Then, in this state, when the second solenoid valve closes the second hydraulic communication passage, the state where the first spool chamber is filled with the hydraulic fluid is maintained, which keeps the hydraulic communication path closed.

On the other hand, in a situation where the hydraulic communication path is closed, when the third solenoid valve opens the third hydraulic communication passage, the first spool chamber is connected to the accumulator. Then, the spool is biased by the biasing member and relatively moved toward the first spool chamber. Thus, the hydraulic fluid filled in the first spool chamber is released into the accumulator. In accordance with that, the hydraulic communication path is opened.

As described above, the hydraulic communication path is opened and closed through the spool valve, selectively opening and closing the first to third hydraulic communication passages having a cross sectional area smaller than that of the hydraulic communication path by means of the first to third solenoid valves controlled by the control device. Accordingly, electromagnetic force required for solenoids of the first to third solenoid valves becomes smaller than that required for directly opening and closing the hydraulic communication path utilizing a large poppet-type solenoid valve. Thus, overall downsizing becomes possible.

According to the second aspect of the present invention, the third solenoid valve is energized to open the third hydraulic communication passage basically only when the hydraulic fluid introduced into the first spool chamber is released into the accumulator. Accordingly, electricity consumption of the third solenoid valve can be reduced.

According to the third aspect of the present invention, for example, in a situation where the spool valve (spool) opens the hydraulic communication path and where the first solenoid valve closes the first hydraulic communication passage, when the second solenoid valve opens the second hydraulic communication passage, the hydraulic fluid of high pressure (higher pressure than a set pressure of the accumulator) in the cylinder (hydraulic communication path) is introduced into the first spool chamber through the second hydraulic communication passage. In accordance with this, the spool is relatively moved toward the second spool chamber against the biasing member and closes the hydraulic communication path.

Then, in this state, when the second solenoid valve closes the second hydraulic communication path, the state where the first spool chamber is filled with the hydraulic fluid is maintained, which keeps the hydraulic communication path closed.

On the other hand, in the state where the hydraulic communication path is closed, when a fluid pressure in the cylinder (hydraulic communication path) becomes lower to approximately set pressure of the accumulator, the hydraulic fluid of high pressure filled in the first spool chamber is released into the cylinder through the check valve provided in the second hydraulic communication passage. Then, the spool is biased by the biasing member and relatively moved toward the first spool chamber. Thus, the hydraulic communication path is opened.

As described above, the hydraulic communication path is opened or closed through the spool valve, selectively opening or closing the first and second hydraulic communication passages having a cross sectional area smaller than that of the hydraulic communication path by means of the first and second solenoid valves controlled by the control device. Accordingly, electromagnetic force required for solenoids of the first and second solenoid valves becomes smaller than that required for directly opening and closing the hydraulic communication path utilizing a large poppet-type solenoid valve. Thus, overall downsizing becomes possible.

Further, in the state where the hydraulic communication path is closed, the hydraulic fluid of high pressure filled in the first spool chamber can be automatically released into the cylinder through the check valve when the fluid pressure in the cylinder (hydraulic communication path) becomes lower to approximately a set pressure of the accumulator. Accordingly, an oil pressure circuit can be made simpler than in the case where a solenoid valve dedicated to corresponding purpose is provided.

Further, the second solenoid valve and the check valve bypassing the second solenoid valve can be made as a unit. Accordingly, the number of parts can be reduced and a degree of freedom for arrangement can be increased.

According to the fourth aspect of the present invention, because the first hydraulic communication passage can be opened without electricity applied to the first solenoid valve, the hydraulic communication path and the accumulator can be hydraulically connected without consuming electricity. Accordingly, for example, when the vehicle is parked, the hydraulic communication path and the accumulator are hydraulically connected and the fluid pressure of the hydraulic communication path (cylinder) can be maintained approximate constant without consuming electricity at the first solenoid valve. Then, thermal expansion, contraction, or the like, of the hydraulic fluid in the hydraulic communication path, or the like, can be absorbed by the accumulator.

According to the fifth aspect of the present invention, the second solenoid valve is energized to open the second hydraulic communication path basically only when the hydraulic fluid of high pressure in the cylinder (hydraulic communication path) is introduced into the first spool chamber. Accordingly, electricity is not required, for example, even for maintaining the state of the first spool chamber filled with the hydraulic fluid (closed state of the hydraulic communication path by the spool valve). Thus, electricity consumption of the second solenoid valve can be reduced.

According to a further aspect of the present invention, a downsized fluid pressure control apparatus for stabilizers can be obtained.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A hydraulic pressure control apparatus for a plurality of stabilizers provided in a vehicle for controlling hydraulic fluid in a hydraulic communication path hydraulically connecting a plurality of cylinders each operatively connected to each of the plurality of stabilizers, comprising:

a spool valve provided in the hydraulic communication path, the spool valve including a housing, a spool movably accommodated in the housing, a first spool chamber defined by the housing and one end of the spool, a second spool chamber defined by the housing and the other end of the spool and hydraulically connected to an accumulator, and a biasing member provided in the second spool chamber for biasing the spool toward the first spool chamber, and the spool relatively moved in the housing selectively toward the first spool chamber or toward the second spool chamber to selectively open or close the hydraulic communication path;

a first hydraulic communication passage hydraulically connecting the accumulator and the hydraulic communication path and having a cross sectional area smaller than that of the hydraulic communication path;

a first solenoid valve provided in the first hydraulic communication passage for selectively opening or closing the first hydraulic communication passage;

a second hydraulic communication passage hydraulically connecting the first spool chamber and the hydraulic communication path and having a cross sectional area smaller than that of the hydraulic communication path;

a second solenoid valve provided in the second hydraulic communication passage for selectively opening or closing the second hydraulic communication passage;

a check valve provided in the second hydraulic communication passage for bypassing the second solenoid valve from the first spool chamber to the hydraulic communication path as a forward direction; and a control device for controlling the first and second solenoid valves to open and close.

2. The hydraulic pressure control apparatus for the stabilizers according to claim 1, wherein
the first solenoid valve is a normally open type of valve which normally opens the first hydraulic communication passage when not energized.

3. The hydraulic pressure control apparatus for the stabilizers according to claim 1, wherein
the second solenoid valve is a normally close type of valve which normally closes the second hydraulic communication passage when not energized.

4. A hydraulic pressure control apparatus for a plurality of stabilizers provided in a vehicle for controlling hydraulic fluid in a main hydraulic communication path hydraulically connecting a plurality of cylinders each operatively connected to each of the plurality of stabilizers, comprising:

a spool valve provided in the main hydraulic communication path, the spool valve including a housing, a spool movably accommodated in the housing, the spool relatively moved in the housing for selectively opening or closing the main hydraulic communication path, a spool chamber defined by the housing and one end of the spool, the spool chamber into which the hydraulic fluid is supplied for pressing the one end of the spool, and a biasing member for biasing the spool toward the spool chamber;

a first sub hydraulic communication passage hydraulically connecting the main hydraulic communication path and the spool chamber for supplying the hydraulic fluid in the main hydraulic communication path to the spool chamber, the first sub hydraulic communication passage having a cross sectional area smaller than that of the main hydraulic communication path;

a first solenoid valve provided in the first sub hydraulic communication passage for selectively opening or closing the first sub hydraulic communication passage;

a discharging mechanism for discharging the hydraulic fluid from the spool chamber; and a control device for controlling the first solenoid valve to open and close.

5. The hydraulic pressure control apparatus for the stabilizer according to claim 4, further comprising:

an accumulator hydraulically connectable to the main hydraulic communication path;

a second sub hydraulic communication passage hydraulically connecting the main hydraulic communication path and the accumulator, the second sub hydraulic communication passage having a cross sectional area smaller than that of the main hydraulic communication path; and a second solenoid valve provided in the second sub hydraulic communication passage for selectively opening or closing the second sub hydraulic communication passage.

6. The hydraulic pressure control apparatus for the stabilizers according to claim 5, wherein the discharging mechanism includes a third sub hydraulic communication passage hydraulically connecting the spool chamber and the accumulator, the third sub hydraulic communication passage having a cross sectional area smaller than that of the main hydraulic communication path, and a third solenoid valve provided in the third sub hydraulic communication passage for selectively opening or closing the third sub hydraulic communication passage.

7. The hydraulic pressure control apparatus for the stabilizers according to claim 6, wherein the third solenoid valve is a normally close type of valve which normally closes the third sub hydraulic communication passage when not energized.

8. The hydraulic pressure control apparatus for the stabilizers according to claim 4, wherein the first solenoid valve is a normally close type of valve which normally closes the first sub hydraulic communication passage when not energized.

9. The hydraulic pressure control apparatus for the stabilizers according to claim 5, wherein the discharging mechanism includes a check valve provided in the first hydraulic communication passage for bypassing the first solenoid valve, and permitting the hydraulic fluid flowing only from the spool chamber to the main hydraulic communication path.

10. The hydraulic pressure control apparatus for the stabilizers according to claim 5, wherein the second solenoid valve is a normally open type of valve which normally opens the second sub hydraulic communication passage when not energized.

11. The hydraulic pressure control apparatus for the stabilizers according to claim 5, wherein the control device energizes the first and the second solenoid valves when the vehicle is turning.

* * * * *